United States Patent
McKinney et al.

[11] 4,015,341
[45] Apr. 5, 1977

[54] SEED DRYING PROCESS AND APPARATUS

[75] Inventors: Howard F. McKinney, Florissant; Nathan L. Higginbotham, Chesterfield; Dick Q. Durant, Manchester, all of Mo.

[73] Assignee: McDonnell Douglas Corporation, St. Louis, Mo.

[22] Filed: Dec. 22, 1975

[21] Appl. No.: 643,507

[52] U.S. Cl. .................................. 34/4; 34/15; 34/92

[51] Int. Cl.² .................. F26B 3/28; F26B 5/04

[58] Field of Search .............. 34/1, 4, 15, 75, 92

[56] References Cited

UNITED STATES PATENTS

| | | | |
|---|---|---|---|
| 1,920,107 | 7/1933 | Richardson | 34/15 X |
| 2,799,947 | 7/1957 | Elwess | 34/15 |
| 3,409,447 | 11/1968 | Jeppson | 34/1 |
| 3,528,179 | 9/1970 | Smith | 34/1 |

*Primary Examiner*—John J. Camby
*Attorney, Agent, or Firm*—Gravely, Lieder & Woodruff

[57] ABSTRACT

Seed is dried with no impairment of its germinating capabilities by subjecting the seed to microwave energy in an atmosphere of reduced pressure. The microwave energy elevates the temperature of the water within the seed to its boiling point, which is quite low because of the reduced pressure, and the water vapor which is released is condensed within the atmosphere of reduced pressure. An apparatus for practicing the process includes an upright pressure vessel, hoppers at each end of the pressure vessel, a perforated processing chute connecting the hoppers, and a control wheel at the lower end of the chute for controlling the speed at which the seed moves through the chute. It also includes a vertical wave guide surrounding the chute and external microwave power units which direct microwave energy into the wave guide and the chute within it. A condenser surrounds the wave guide within the pressure vessel.

13 Claims, 7 Drawing Figures

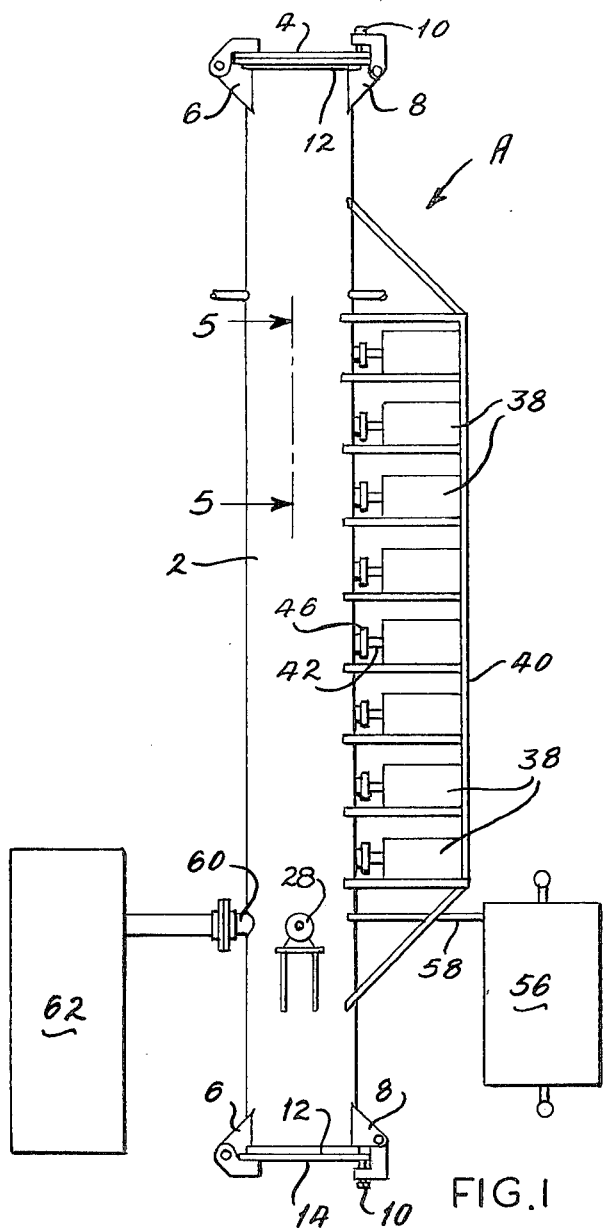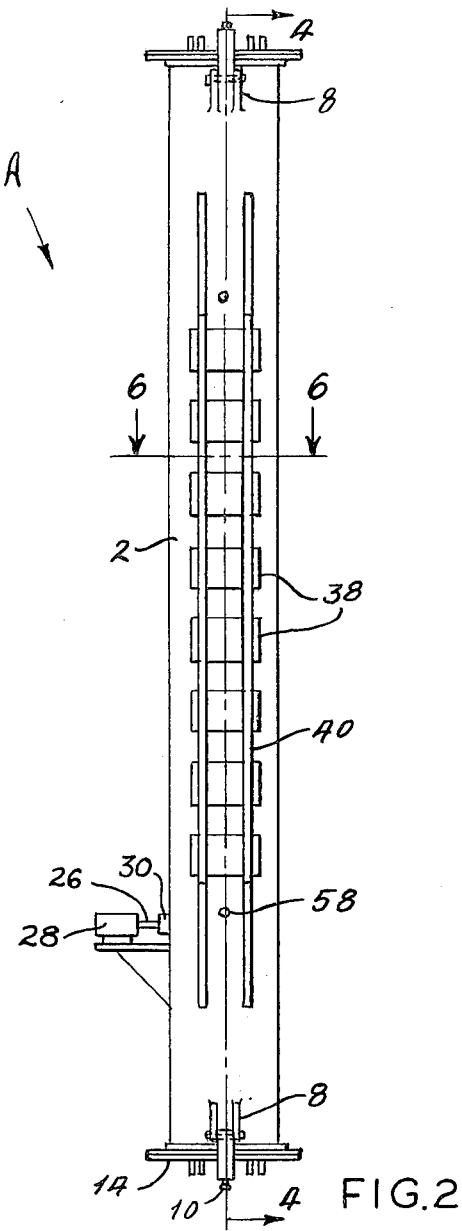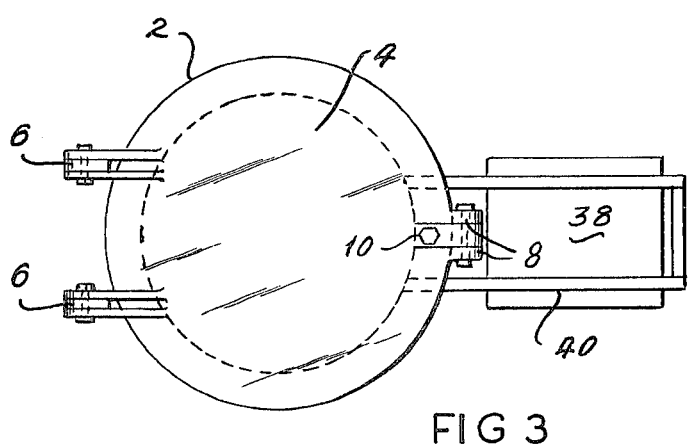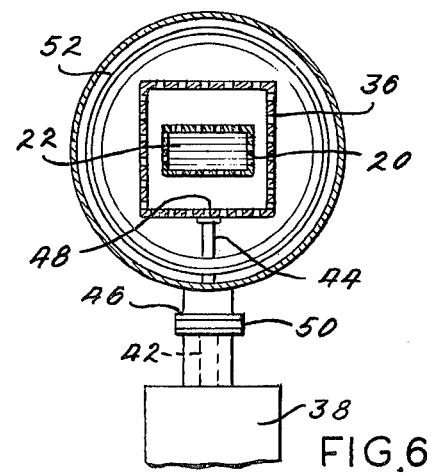

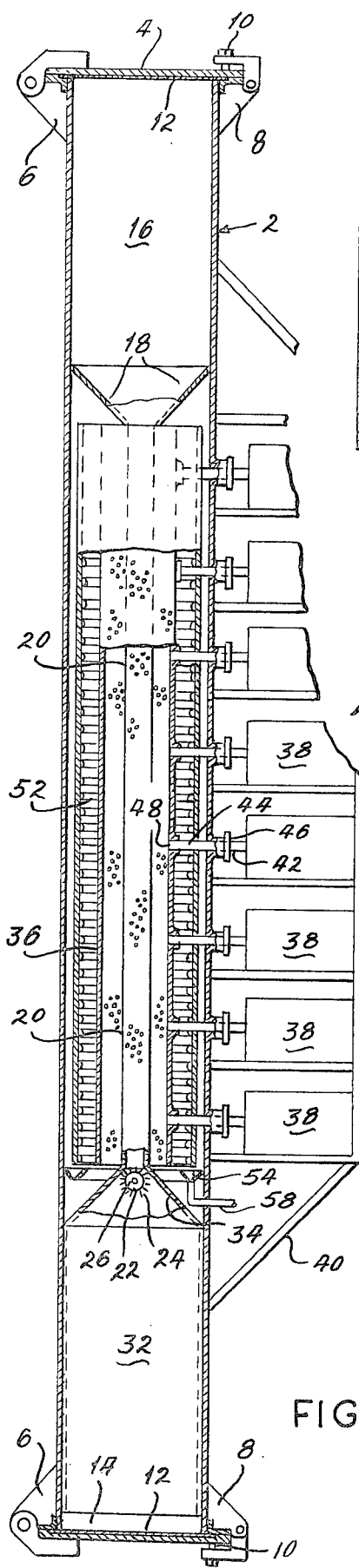
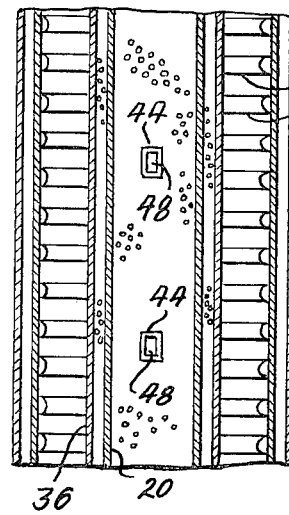
FIG. 5
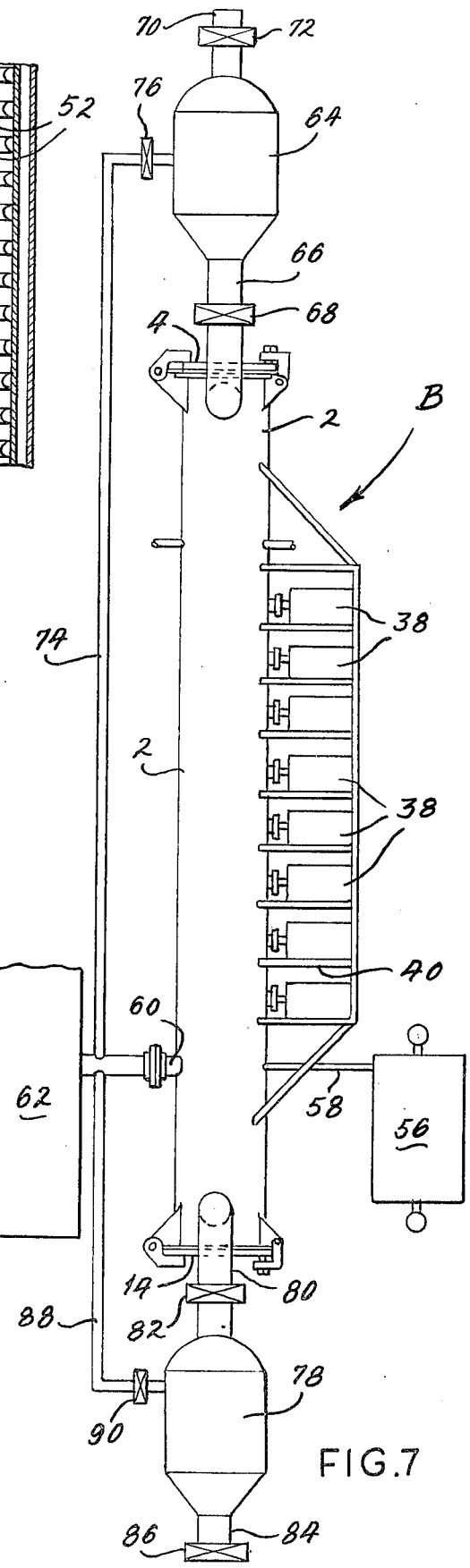
FIG. 4
FIG. 7

SEED DRYING PROCESS AND APPARATUS

BACKGROUND OF THE INVENTION

Modern large scale farming produces large crops which are harvested at high rates, usually while still relatively wet. Since the spoilage time for these wet crops is relatively short, they are dried within a few days of harvest, normally in hot air dryers which force heated air over the crops. These dryers consume tremendous amounts of fuel which is usually natural gas or fuel oil. They further raise the crops to excessively high temperatures, and this has an adverse effect on the germination capabilities of the crop, assuming that it is destined for seeding purposes as opposed to feeding purposes. Where the crops are used for feeding purposes, the high temperatures are detrimental to the nutritive value, the taste, and the capacity to withstand long storage periods.

Corn, which is the nation's largest crop, if one of the most difficult crops to dry since each kernel of corn has a hull which retains the moisture within the kernel. Feed corn is normally harvested at moisture contents of 25% and is thereafter dried to a moisture content of about 15% for storage. Seed corn, on the other hand, is harvested sooner, that is, when its moisture content is about 40%. This corn is initially dried on the cob to about 30%, whereupon the kernels are easily removed, and thereafter the kernels are dries still further to about 15%. The dried corn kernels are thereupon stored for the next year's planting. Extreme care must be exercised in the drying to avoid heating the seed corn to excessive temperature, for excessively high temperatures will adversely affect the germination capabilities of the corn.

Practically all crops require reduction in moisture content for storage, although some require more drying than others.

SUMMARY OF THE INVENTION

One of the principal objects of the present invention is to provide a process for drying seeds without significantly impairing the germinating capabilities of the seed. Another object is to provide a process of the type stated which heats the seeds uniformly and drys at low temperature to avoid damaging the seeds. A further object is to provide a process of the type stated which is highly efficient in that it uses 50% to 60% of energy required by current processes. An additional object is to provide a process of the type stated which uses electrical energy instead of expensive fuel oil or natural gas. Still another object is to provide a process of the type stated which easily adapts itself to a closed system so that products of combustion and dust are not emitted into the atmosphere and noise is kept to an absolute minimum. Yet another object is to provide an apparatus for carrying out the process.

These and other objects and advantages will become apparent hereinafter.

The present invention is embodied in a process which includes subjecting seed to microwave energy within an atmosphere of reduced pressure so as to vaporize the water within the seed at a relatively low temperature. The vaporized water is driven from the seed. The invention is further embodied in an apparatus for accomplishing the process. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 1 is a front elevational view of the apparatus for drying seeds in accordance with the present invention;

FIG. 2 is a side elevational view of the apparatus;

FIG. 3 is a top view of the apparatus;

FIG. 4 is a sectional view taken along lines 4—4 of FIG. 2;

FIG. 5 is a fragmentary sectional view taken along lines 5—5 of FIG. 1;

FIG. 6 is a fragmentary sectional view taken along lines 6—6 of FIG. 2; and

FIG. 7 is an elevational view of a modified apparatus for performing the process of a continuous basis.

DETAILED DESCRIPTION

Basically, the process of the present invention concerns the drying of seeds with microwave energy while the seeds are in a low pressure environment. The process is particularly suitable for corn, which is the largest crop in the United States, and is perhaps the most difficult of all crops to dry. The process is also suitable for drying such widely diverse crop seeds as peanuts, pecans, rice, wheat, soybeans, triticale and even flower seeds.

In its most basic format the process involves placing seed which is to be dried in a pressure vessel and then evacuating air from the vessel. Indeed, the air is evacuated until the pressure within the vessel ranges between 50 and 500 mm Hg. or between 0.001 and 5 mm Hg. While the seed is within the low pressure environment of the pressure vessel, it is subjected to microwave energy generated by a suitable microwave power unit. This energy is directed or channeled into the interior of the pressure vessel by a wave guide which passes through the wall of the pressure vessel. In other words, the microwave source is located externally of the pressure vessel, but the electromagnetic waves it generates are directed into the interior of the vessel through the wave guide. Indeed, the waves are directed at the seed within the pressure vessel. The frequency of the microwaves may be any frequency within the range which excites water molecules. In this regard, it is known that microwave energy within the frequency range of about $10^2$ MHz to $10^4$ MHz will cause water molecules to oscillate at the frequency of the waves. This oscillation generates heat, and the heat which is generated is enough to elevate the temperature of the water to the boiling point, provided, of course, that the microwave field is sufficiently powerful. As a practical matter, the only two frequencies which will be used are 915 MHz and 2450 MHz, since those are the only two frequencies which the Federal Communications Commission has allotted for commercial microwave heating applications.

With regard to the seed within the pressure vessel, the microwave energy causes the water within that seed to boil off, but the temperature at which the boiling occurs is substantially below that of water at atmospheric pressure. Indeed, when the pressure is 60 mm Hg, the water will boil at 107° F. The temperature of the seed in the microwave field is elevated about 10°to 20° F. above the temperature at which the water within it boils.

The pressure vessel further contains a condenser which may use ordinary water entering at 32° F. to 100°

F. The water vapor upon contacting the cool condenser condenses to liquid water which is collected in the vessel. As a result, no significant rise in pressure occurs within the vessel, notwithstanding the introduction of the water vapor into it.

The microwave unit remains energized long enough to reduce the moisture content of the seed to the desired level. For example, seed corn, that is the corn which is harvested to produce next year's crop, is normally harvested quite early when its moisture content is about 40%. The corn is subjected to microwave energy until its moisture content is about 15%, which has been found most suitable for storage. Usually two drying steps are employed. In the first the kernels while still on the cob are subjected to the preliminary drying to reduce the moisture content to about 30%; then the kernels are removed from the cob and are dried still further until the moisture content is about 15%. Both drying steps may be carried out pursuant to the process of this invention.

Feed corn, on the other hand, is harvested when its moisture content is about 30%, and it is subjected to a lesser amount of microwave energy to reduce its moisture content to 15% for storage. The drying occurs after the kernels have been removed from the cob.

The pressure range between 5 and 50 mm Hg should be avoided, for within this pressure range the glow discharge phenomenon occurs, and the water is not effectively evaporated from the seed. On the contrary, the microwave energy tends to scorch the seed when glow discharge occurs.

EXAMPLE I

A recently harvested batch of corn weighing five pounds and containing 26.6 percent moisture was placed in a pressure vessel and the vessel was thereafter evacuated with a vacuum pump until the pressure within it reached 60 mm Hg. With the pump still operating, the seed was subjected to a microwave field generated by a nominal 600 watt microwave power unit. The frequency of the field was 2450 MHz. The pressure vessel contained a condenser coil therein and water at 60° F. entered this coil and was circulated. The water vapor driven from the corn condensed on the coil and collected in the pressure vessel. The cooling water left the condenser coil at about 65° F.

After 19.5 minutes, the microwave power unit was shut down and the interior of the vessel was vented to the atmosphere. The corn was then removed and weighed. It weighed 4.4 pounds and had a moisture content of 11.5 percent. The germination percentage was 75.5 to 81.5 percent.

The germination percentage for undried corn of the same batch was 50.3 to 55.2 percent. Typically, corn dried with forced hot air at 120°–130° F. has a germination percentage of 30 percent or less.

APPARATUS

The foregoing process may be carried out in a drying apparatus A (FIGS. 1 and 2), including a cylindrical pressure vessel 2 formed from stainless steel which is about 30 feet tall and 36 inches in diameter. Closing the upper end of the vessel 2 is a top plate 4 (FIG. 3), which on one side is hinged to a pair of hinge brackets 6 so that it may be pivoted away from the upper end of the housing 2 to expose the interior thereof. The other side of the plate 4 is located opposite a hold down bracket 8 which is located on the other side of the vessel 2 from the hinge brackets 6. The hold down bracket 8 carries a jack screw 10 which when turned down against the top plate 4 forces the top plate 4 against the upper rim of the vessel 2. Actually, the jack screw 10 compresses an elastomeric seal 12 (FIG. 4) located between the upper rim of the vessel 2 and the top plate 4, and this seal forms an air-tight barrier between the plate 4 and vessel 2. The lower end of the vessel 2 is closed by a lower plate 14 which is similarly retained in place by hinge and hold down brackets 6 and 8 and a jack screw 10 and is further sealed by an elastomeric seal 12.

The upper end of the vessel 2 forms a supply hopper 16 (FIG. 4) for holding a relatively large supply of seed. In this regard, the hopper 16 is about 6 feet high and occupies the entire width of the vessel 2. The hopper 16 at its lower end is provided with a tapered transition 18 which converges into a rectangular opening, at which the hopper 16 empties into a vertical processing chute 20.

The processing chute 20 (FIGS. 4 and 6) is formed from a non-metallic material which is not excited by microwave energy, yet is transparent to that energy so that such energy will be transferred through it. The chute 20 is rectangular in configuration and is centered with respect to the cylindrical vessel 2. Preferably, it measures 6 + 12 inches and extends about 16 feet downwardly from the rectangular opening in the bottom of the transition 18. The chute 20 has a multitude of perforations for its entire length, but these perforations are smaller than the seeds so the seeds do not pass through them.

At the lower end of the processing chute 20 is a flow control wheel 22 (FIG. 4) having vanes 24 projected radially from it. The wheel 22 is mounted on a shaft 26 which extends through the wall of the vessel 2, beyond which it is connected with a variable speed electric motor 28 (FIG. 2). The surface of the shaft 26 is embraced by a seal 30 at the cylindrical wall of the vessel 2, and this seal prevents entry of air into the interior of the housing 2. Seed which is introduced into the supply hopper 18 gravitates to the entrance to the processing chute 20 and falls downwardly through that chute to the flow control wheel 22 which prevents the seed from escaping. Indeed, the wheel 22 causes the seed to accumulate in the processing chute 20 and to further accumulate in the hopper 16 above the chute 20. As the wheel 22 rotates the vanes 24 thereon dislodge a limited amount of seed from the lower end of the chute 20 with the rate at which the seed leaves being dependent on the angular velocity of the wheel 22.

The lower end of the processing chute 20 opens into a collecting hopper 32 (FIG. 4) which has about the same volume as the supply hopper 16 and is closed at its lower end by the lower plate 14. The hopper 32 extends the full width of the vessel 2, but at its upper end it is provided with a tapered transition section 34 which is joined to the lower end of the processing chute 20. The control wheel 22 is located within the transition section 34. Thus, seed which is removed from the processing chute 20 by the control wheel 22 collects in the collecting hopper 32.

The processing chute 20 is enclosed within a vertical wave guide 36 (FIGS. 4 and 6) which is formed from a suitable metal such as steel and extends the full length of the processing chute 20. The vertical guide 36 is square in cross-section, preferably measuring approximately 18 + 18 inches, and has its longitudinal center line co-linear with the longitudinal centerline of the chute 20. Moreover, the opposed walls of the guide 36 and chute 20 are parallel. The configuration of the wave guide 36 is such that microwave energy will be confined within the interior of the guide 36, and this energy, of course, passes through the processing chute 20.

The microwave energy is derived from eight microwave power units 38 (FIGS. 1 and 2) which rest on a supporting framework 40 welded to the external surface of the housing 2. Each power unit 38 has an emitter guide 42 (FIG. 6) which is coupled to a lateral wave guide 44 at a flange 46. The lateral wave guide 44 extends through the wall of the vessel 2 and projects all the way to the vertical wave guide 36, opening into the interior of the wave guide 36 at an aperture 48 therein (FIG. 5). Both the emitter guide 42 and the lateral guide 44 confine microwaves generated in the power unit 38 to the aligned interiors of those guides so that the microwave energy is directed into the interior of the vertical wave guide 36. The lateral guide 44 is exposed to and at the same pressure as the interior of the vessel 2, but the emitter guide 42 is not, since a separating plate 50 (FIG. 6) isolates the interiors of the two guides 42 and 44 from each other. The separating plate 50 is clamped between the two flanges 46 and is nonmetallic and transparent to the microwaves so that they pass through it without impairment. The eight power units 38 are preferably rated at 5KV each and emit microwave energy at either 915 MHz or 2450 MHz, which are the two microwave frequencies allotted by the Federal Communications Commission for commercial microwave heating operations in the United States. Suitable microwave power units 38 are available from commercial sources in the United States.

The portion of the vessel 2 through which the vertical wave guide 36 and processing chute 20 extend is further occupied by a condenser coil 52 (FIGS. 4–6) which encircles the wave guide 36. One end of the coil 52 is connected to a source of water, and that source is capable of delivering the water at between 32° F. and 100° F. The source should be capable of delivering the water at a minimum flow rate of 25 gal./min. Interposed between the lower end of the coil 52 and the tapered upwardly presented surface of the lower transition section 34 is an annular collector trough 54 (FIG. 4) which opens upwardly directly beneath the convolutions of the coil 52. The trough 54 is connected to an external drain tank 56 (FIG. 1) by a drain line 58 which passes through the sidewall of the vessel 2.

Finally, the vessel 2 is provided with an evacuation port 60 (FIG. 1) which opens into the interior of the vessel 2 in the vicinity of the transition section 34 on the collector hopper. This port 60 in turn is connected to a vacuum pump 62, which when energized, will evacuate air from the interior of the housing 2 and reduce the pressure of the air therein. The pump 62 is powered by an electric motor (not shown).

OPERATION

To dry seed, which may be seed directly from a harvest or seed which has already been subjected to a preliminary drying operation, the top plate 4 is swung upwardly and away from the upper end of the vessel 2 to expose the supply hopper 16 within the vessel 2. Then sufficient grain to fill the processing chute 20 and the supply hopper 16 is introduced into the supply hopper 16. This grain gravitates to the bottom of the processing chute 20, but is prevented from dropping into the collecting hopper 32 by the control wheel 22 which blocks the lower end of the chute 20. Once the supply hopper 16 is filled, the top and lower plates 4 and 14 are swung over ends of the vessel 2 and secured firmly in place by turning the jack screws 10 down against them. This compresses the elastomeric seals 12 on the ends of the vessel 2 so that the interior of the vessel 2 is completely isolated from the surrounding atmosphere.

Next the vacuum pump 62 is energized to evacuate air from the interior of the vessel 2. The pressure within the vessel 2, of course, drops. When the pressure comes within the range of 0.001 mm Hg to 5 mm Hg or within the range of 50 mm Hg to 500 mm Hg, cooling water at between 32° F. and 100° F. is circulated through the condenser coil 52 at between 25 and 35 gal./min., and the microwave power units 38 are energized. Shortly thereafter the electric motor 28 for the control wheel 22 is energized such that it rotates the wheel 22 at sufficient speed to remove between 10 lbs. and 30 lbs. of seed per minute from the processing chute 20. The microwave energy passes through the emitter guides 42 and lateral wave guides 44 to the interior of the vertical wave guide 36 wherein it assumes a vertical orientation. Since the processing chute 20 is transparent to the waves and is not affected by them, the waves pass through the chute 20 and also through the seed within the chute 20. The seed, however, contains moisture, and the molecules of water are excited such that they oscillate back and forth at the high frequency of the microwave field. This rapid oscillation generates heat, and indeed sufficient heat is produced to raise the temperature of the water to its boiling point. The temperature at which the water boils is, of course, dependent on the pressure within the housing 2, but in any event is considerably less than the temperature required to boil water at atmospheric pressure. For example, at a pressure of 60 mm Hg, the water boils off at about 107° F. Thus, the seed is elevated to a temperature slightly in excess of the boiling point of water at the particular pressure within the vessel 2. The variable speed motor 28 is adjusted to rotate the control wheel 22 at a speed which withdraws the seed from the chute 20 before the moisture level within the seed drops below a prescribed value. In other words, the speed of the wheel 22 should be such that each individual seed will pass from the top of the chute 20 to the bottom of the chute 20 within a prescribed time and during that time it is subjected to the microwave energy. The time should be long enough to drop the moisture content to the prescribed value. For example, corn should remain in the microwave field for about 60 minutes to drop its moisture content from 25%. Thus, during normal processing, a kernel of corn should pass from the top of the chute 20 to the bottom of the chute 20 in 60 minutes. While the rotating wheel 22 causes the seed to discharge from the chute 20, it does not agitate the seed within the chute 20. On the contrary, as the seed is discharged, the entire column of seed within the chute 20 merely drops as a whole and the individual seeds experience little if any displacement relative to each other.

The water vapor which is driven from the seed in the chute 20 passes through the perforations in the chute 20 and into the space between the chute 20 and the wave guide 36. The water vapor likewise passes out of the wave guide 36 through the perforations therein. Eventually, the water vapor comes against the cold convolutions of the condenser coil 52 where it is condensed back into liquid water. This water drops downwardly and is collected in the trough 54, from which it is drained to the external drain tank 56. Were it not for the condenser coil 52, the water vapor would elevate the pressure within the vessel 2 which in turn would cause the water to boil at a higher temperature, thus elevating the seed to the higher temperature.

The fact that the seed is dried at a relatively low temperature preserves the germination characteristics of the seed. Seed dried according to the process of the present invention has been found to have substantially better germination qualities than seed which is not dried or else is dried using conventional forced hot air processes. For example, corn seed dried during one test at 60 mm Hg using the present process had a germination percentage of 75.5 and 81.5%. The same corn which was not dried had a germination percentage of 50.3 and 55.2%.

The entire process, furthermore, takes place within the confines of the pressure vessel 2, and since the vessel 2 is sealed, no dust or offensive odors escape into the atmosphere. Likewise, electricity is the sole source of energy for the process. No products of combustion are created as in the conventional forced hot air process, and likewise high operating temperatures such as may develop in an oil fired heater are reduced. In this same vein, the reduced operating temperatures and the drying in an evacuated atmosphere reduces the possibility of fire or explosion for all practical purposes, whereas the conventional process enhances that possibility.

In terms of total energy requirements, the process of this invention is considerably more efficient than the forced hot air process in that it requires only 38% to 61% of the energy demanded by the forced hot air process to dry an equivalent amount of corn. In this regard, most of the energy used in the forced air process is heat necessary to elevate the temperature of the airstream to 140° F., although some electrical energy is required for the fans. In the process of this invention most of the energy is consumed by the microwave power units, with a substantially lesser amount being required to operate the vacuum pump.

MODIFICATION

A modified drying apparatus B (FIG. 7) is in effect the drying apparatus A with additional components which enable the process to proceed on in a continuous basis instead of on a batch basis.

The additional components include an external preliminary hopper 64 which is connected with the supply hopper 16 of the pressure vessel 2 through a transfer tube 66 containing a valve 68. The preliminary hopper 64 possesses about the same volume as the supply hopper 16 and will, therefore, hold about as much seed. The tube 66 and valve 68 are such that when the valve 68 is opened, seed will pass from the preliminary hopper 64 to the supply hopper 16 in the pressure vessel 2. The preliminary hopper 64 has an inlet port 70 containing a valve 72, and the seed is introduced into the hopper 64 through the port 70 when the valve 72 is open. The preliminary hopper 64 is further connected to the vacuum pump 62 through a vacuum line 74 containing a valve 76.

The same type of arrangement exists at the opposite end of the pressure vessel 21. In particular, the collecting hopper 32 within the vessel 2 is connected to an external terminal hopper 78 through a transfer tube 80 containing a valve 82. Accordingly, the terminal hopper 78 receives dried seed from the collecting hopper 32. The dried seed is withdrawn from the terminal hopper 78 through a discharge port 84 containing a valve 86. The terminal hopper 78 is connected to the vacuum pump 62 through another vacuum line 88 having a valve 90 therein.

The operation of the modified drying apparatus B is quite similar to that of the drying apparatus A. The harvested seed is introduced into the supply hopper 16 through the inlet port 70, valve 72, preliminary hopper 64, transfer tube 66, and valve 68, with the valves 68 and 72 being, of course, open. The valves 68 and 76 at the preliminary hopper 64 are then closed as is the valve 86 at the bottom of the terminal hopper 78. The valve 90 in the vaccum line 88 to the hopper 78 is open. Thereupon, the vacuum pump 62 is energized followed by the microwave power units 38, and the process proceeds within the confines of the pressure vessel 2 as previously described.

While the seed is being dried within the pressure vessel 2, another supply of seed is introduced into the preliminary hopper 64 through its inlet port 70 and opened valve 72 after which valve 72 in that tube is closed. Next, the valve 76 in the vacuum line 74 is opened and as a result the sealed preliminary hopper 64 is connected to the vacuum pump 62 and its pressure is reduced to that of the pressure in the pressure vessel 2. Since the valves 82 and 90 at the terminal hopper 78 are open while the valve 86 is closed, the pressure within the terminal hopper 78 is likewise reduced to that of the pressure in the pressure vessel 2.

When all of the seed within the pressure vessel 2 is dried, it will pass through the collecting hopper 32 and into the terminal hopper 78 since the valve 82 is open. The valves 82 and 90 are then closed to enable the pressure vessel 2 to continue operation at the reduced pressure, while the dried seed is removed from the terminal hopper 78 through the discharge port 84. When the valve 86 is opened, additional dried seed collected in the collecting hopper 32 is withdrawn from the collecting hopper 32 by first closing the valve 86 and then opening the valve 90 in the vacuum line 88 to reduce the pressure within the terminal hopper 78 to the pressure within the pressure vessel 2. Proper operational sequencing of the valves 90, 82, and 86 results in no loss of pressure during continuous vacuum conditions.

The valve 82 is then opened, allowing the dried seed in the collecting hopper 32 to drop into the terminal hopper 78 at the same reduced pressure. Thereafter, the valves 82 and 90 are closed, thereby isolating the terminal hopper 78 from the vacuum pump 62, and then the valve 86 is opened to permit the dried seed to fall from the terminal hopper 78.

While the dried seed is being transferred to the terminal hopper 78, the moist seed within the preliminary hopper 64 is transferred to the supply hopper 16 within the pressure vessel 2 by opening the valve 68.

The foregoing procedure is then repeated so the pressure vessel 2 in effect operates under a continuous vacuum, and it is not necessary to re-establish the vacuum with each batch which passes through the pressure vessel 2.

This invention is intended to cover all changes and modifications of the example of the invention herein chosen for purposes of the disclosure which do not constitute departures from the spirit and scope of the invention.

What is claimed is:

1. A process for drying seed without significantly impairing the germinating qualities of the seed, said process comprising: placing the seed in an atmosphere of substantially reduced pressure; subjecting the seed to microwave energy while maintaining the individual seeds in a generally quiescent condition with respect to one another, the seed being subjected to the microwave energy while the seed is within the atmosphere of reduced pressure so as to convert liquid water within the seed to water vapor which leaves the seed and enters the atmosphere of reduced pressure; and condensing the water vapor derived from the seed while the water vapor is in the atmosphere of reduced pressure.

2. The process according to claim 1 wherein the water vapor is condensed on a condenser coil through which a liquid is circulated.

3. The process according to claim 2 wherein the liquid is between 32° F. and 100° F. when it enters the coil.

4. The process according to claim 1 wherein the pressure within the atmosphere of reduced pressure is between about 0.001 mm Hg and 500 mm Hg with the range between about 5 mm Hg and about 50 mm Hg being excluded.

5. An apparatus for drying seed, said apparatus comprising: a pressure vessel; means defining a chamber within the pressure vessel; a microwave power unit located externally of the pressure vessel and being capable of generating microwave energy; a wave guide extending from the microwave power unit through the wall of the vessel and opening into the chamber within the vessel, the wave guide being configured to direct the microwave energy into the chamber; means for holding the seed within the chamber and being formed from a non-metallic material which is not affected by the microwave energy; a vacuum pump connected with the vessel and being capable of reducing the pressure in the vessel, whereby the microwave energy will elevate the temperature of the water in the seed sufficiently to convert it to water vapor which escapes from the seed; a condenser in the pressure vessel; and means for maintaining the condenser at a temperature low enough to condense the water vapor on the condenser.

6. An apparatus according to claim 5 wherein the condenser is a coil through which a liquid is circulated; and further comprising a trough below the condenser coil for collecting the water condensed on the condenser coil.

7. An apparatus according to claim 5 wherein the means for holding the seed is perforated so that the water vapor will escape from said means.

8. An apparatus according to claim 7 wherein the means for holding the seed is an upright chute and control means at the bottom of the chute for controlling the rate at which seeds drop from the tube.

9. An apparatus according to claim 8 wherein the control means comprises a wheel which rotates about a horizontal axis below the chute and is provided with vanes which pass beneath and in close proximity to the bottom of the chute to engage the seed in the chute.

10. An apparatus according to claim 9 wherein the means defining the chamber in the vessel is formed from metal and serves as a wave guide for the microwave energy generated by the microwave power unit; wherein the means for holding the seed is a chute which extends through the chamber; and the condenser is located externally of the means defining the chamber.

11. An apparatus according to claim 10 wherein the condenser is a coil which encircles the means defining the chamber.

12. An apparatus for drying a moisture-bearing substance, said apparatus comprising: a pressure vessel having a chamber therein; a microwave power unit located externally of the pressure vessel and being capable of generating microwave energy; a wave guide extending from the microwave power unit through the wall of the vessel and opening into the chamber, the wave guide being configured to direct the microwave energy into the chamber; means for holding the substance to be dried within the chamber and being formed from a non-metallic material which is not affected by the microwave energy; a vacuum pump connected with the vessel and being capable of significantly reducing the pressure in the vessel, whereby the microwave energy will elevate the temperature of the water in the substance to be dried sufficiently to convert it to water vapor which escapes from the substance; a condenser having a condensing surface exposed to the interior of the pressure vessel so that the water vapor which escapes from the seed will come against the surface; and means for maintaining the condenser at a temperature sufficiently low to condense the water vapor to liquid water on the surface.

13. An apparatus according to claim 12 and further comprising means for causing the substance to move through the chamber without agitating the substance.

* * * * *

UNITED STATES PATENT OFFICE
CERTIFICATE OF CORRECTION

Patent No. 4,015,341          Dated April 5, 1977

Inventor(s) McKinney, Higginbotham, and Durant

It is certified that error appears in the above-identified patent and that said Letters Patent are hereby corrected as shown below:

Column 1, line 20, "if" should be "is".

Column 1, line 29, "dries" should be "dried".

Column 2, line 16, "of" should be "on".

Column 4, line 27, "+" should be "X".

Column 4, line 68, "+" should be "X".

Column 6, line 54, after "25%" and before "." insert "to 15%".

Signed and Sealed this

Fourteenth Day of June 1977

[SEAL]

Attest:

RUTH C. MASON
Attesting Officer

C. MARSHALL DANN
Commissioner of Patents and Trademarks